US 6,729,353 B2

(12) United States Patent
Nguyen

(10) Patent No.: US 6,729,353 B2
(45) Date of Patent: May 4, 2004

(54) MODULAR FLUID DELIVERY APPARATUS

(75) Inventor: Nhan Nguyen, Santa Ana, CA (US)

(73) Assignee: Asml Us, Inc., Scotts Valley, CA (US)

( * ) Notice: Subject to any disclaimer, the term of this patent is extended or adjusted under 35 U.S.C. 154(b) by 0 days.

(21) Appl. No.: 09/800,595

(22) Filed: Mar. 6, 2001

(65) Prior Publication Data

US 2002/0050299 A1 May 2, 2002

Related U.S. Application Data

(63) Continuation-in-part of application No. 09/388,216, filed on Sep. 1, 1999, now abandoned.

(51) Int. Cl.$^7$ ............................................. F16K 11/10
(52) U.S. Cl. ....................................... 137/884; 137/597
(58) Field of Search ................................ 137/597, 884; 251/367

(56) References Cited

U.S. PATENT DOCUMENTS

| 3,135,290 A | | 6/1964 | Carls |
| 3,589,387 A | | 6/1971 | Raymond |
| 3,680,589 A | | 8/1972 | Jeans et al. |
| 3,766,943 A | | 10/1973 | Murata |
| 3,976,098 A | | 8/1976 | Raymond |
| 4,597,412 A | * | 7/1986 | Stark .......................... 137/606 |
| 4,703,913 A | | 11/1987 | Hunkapiller |
| 4,723,712 A | * | 2/1988 | Egli et al. .................... 137/606 |
| 4,930,401 A | | 6/1990 | Cameron et al. |
| 5,106,169 A | | 4/1992 | Barefoot |
| 5,803,123 A | | 9/1998 | Bell et al. |
| 5,819,782 A | | 10/1998 | Itafuji |
| 5,964,481 A | | 10/1999 | Buch |
| 5,975,112 A | | 11/1999 | Ohmi et al. |
| 5,983,933 A | | 11/1999 | Ohmi et al. |
| 5,992,463 A | | 11/1999 | Redemann et al. |
| 6,109,303 A | | 8/2000 | Itafuji et al. |

FOREIGN PATENT DOCUMENTS

| EP | 0 845 623 A1 | 6/1998 |
| GB | 1 206 828 | 1/1968 |

* cited by examiner

Primary Examiner—John Fox
(74) Attorney, Agent, or Firm—Dorsey & Whitney LLP

(57) ABSTRACT

A fluid delivery apparatus for transporting a fluid to one or more fluid handling components. The fluid delivery apparatus includes one or more modular subassemblies having an upper module, a lower module, and a base block. The upper module includes a passageway for coupling with a fluid handling component such that the upper passageway is in fluid communication with the fluid handling component. The lower module includes a lower passageway for coupling with the upper module such that the passageways are in fluid communication. The lower module includes a flow channel having a lower passageway. The base block includes a receptacle and a channel. The upper module is received within the receptacle and the lower module extends through the channel. The modular subassembly can include a spacer having a plurality of alignment apertures for aligning fluid coupling ports of the upper and lower modules. A method of using the fluid delivery apparatus is also disclosed.

18 Claims, 18 Drawing Sheets

MODULAR FLUID DELIVERY APPARATUS

RELATED APPLICATIONS

This application is a Continuation-in-Part of U.S. patent application Ser. No. 09/388,216 filed Sep. 1, 1999 now abandoned, the entire contents of which is incorporated herein by this reference.

FIELD OF THE INVENTION

The present invention relates to an apparatus for delivery of a fluid to a tool and more specifically to a modular apparatus for delivery of a fluid to tool.

BACKGROUND OF THE INVENTION

Systems for delivery of a fluid to a tool have a variety of different applications. For instance, the chemical vapor deposition technique used in certain semi-conductor manufacture processes requires that a fluid be delivered to a rapid thermal process (RTP) reactor. The fluid must be delivered to the RTP reactor under very specific conditions. These specific fluid conditions are achieved with the use of a fluid delivery system which transports the fluid to a number of fluid handling components before delivering the fluid to the RTP reactor. These fluid handling components typically measure or adjust the characteristics of the fluid within the fluid delivery system.

The typical fluid delivery system is frequently modified and updated. Many of these modifications require that the fluid delivery system be disassembled and reassembled in a different configuration. As a result, fluid delivery systems must be highly adaptable.

Fluid delivery systems have been modularized in an attempt to increase their adaptability. Modular fluid delivery systems typically include a plurality of independent modules which can be coupled with one another and with fluid handling components. The modules and fluid handling components each include one or more passageways which are aligned with one another upon assembling the fluid delivery system. Alignment of the passageways forms an extended channel through the fluid delivery system. The extended channel serves to transport fluids to the fluid handling components before the fluid is delivered to the tool.

Many modular fluid delivery systems require a large variety of modules in order to retain their adaptability. The large number of modules are often associated with an increased complexity in maintaining the fluid delivery system. Further, a large number of modules can be associated with increased storage costs since spare modules must frequently be stored in order to properly maintain the fluid delivery systems. Further, the large number of modules contributes significantly to the increased overall weight of the fluid delivery system.

Another challenge associated with modular fluid delivery systems is prevention of fluid leaks between adjacent modules or between a module and a fluid handling component. The leaks are prevented by formation of a seal between the adjacent modules and/or between a module and an adjacent fluid handling component. These seals are known to break down over time. Modules within the fluid delivery system must often be temporarily removed or even replaced in order to reform the seal.

Prior modular delivery systems have presented considerable challenges when a module must be removed or replaced. For instance, many modular fluid delivery systems require that a large portion of the modules be removed before a single module can be replaced and/or that the entire fluid delivery system be disassembled before a single module can be removed. As a result, simple changes in these modular fluid delivery systems can be very time consuming and accordingly, very expensive. Additionally, the number of modules which must be moved and the extended time required to make these modifications can result in contamination of the fluid delivery system.

For the above reasons, there is currently a need for a modular fluid delivery system which permits the modules to be easily accessed, removed and/or changed. There is also a need for a modular delivery system with a reduced opportunity for systemic contamination. Additionally, there is a need for a modular delivery system which retains adaptability with fewer modules. Additionally, there is a need for a modular delivery system which requires fewer modules thus reducing cost and minimizing weight of the system.

SUMMARY OF THE INVENTION

The invention relates to a fluid delivery apparatus for transporting a fluid to one or more fluid handling components. The fluid delivery apparatus includes one or more modular subassemblies, each subassembly including an upper module, a lower module, and a base block. The upper module includes one or more upper passageways and is configured to be coupled with a fluid handling component such that the upper passageway is in fluid communication with the fluid handling component. The lower module includes one or more lower passageways and is configured to be coupled with the upper module such that the lower passageway is in fluid communication with the upper passageway. The lower module can include a plurality of flow channels, each flow channel including a lower passageway. The base block includes a receptacle and a channel. The upper module is received within the receptacle and the lower module extends through the channel. The modular subassembly can include a spacer having a plurality of alignment apertures for aligning fluid coupling ports of the upper and lower modules. A method of using the fluid delivery apparatus is also disclosed.

DETAILED DESCRIPTION

Figure 1:
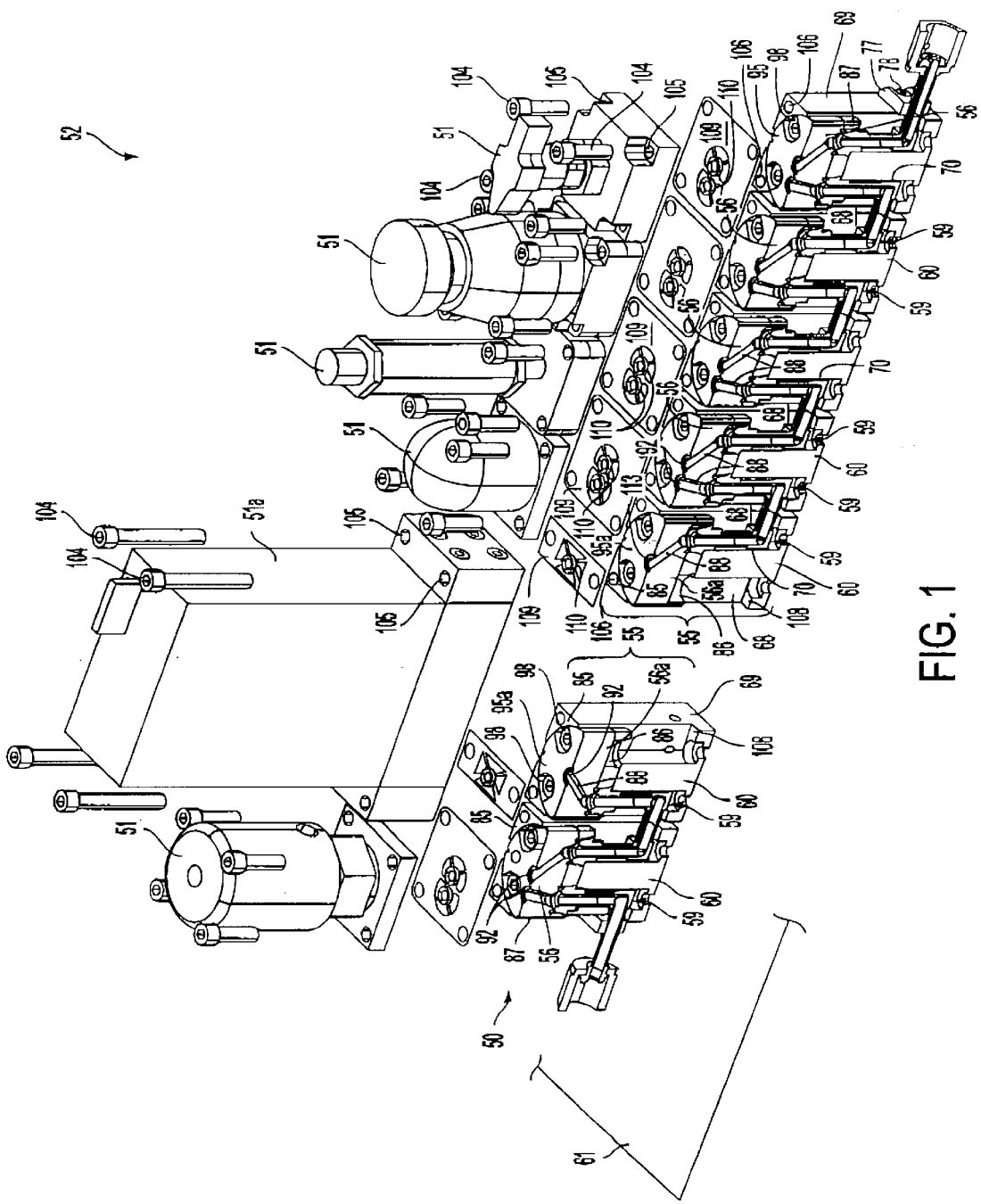
FIG. 1 is a partially exploded perspective view of a modular fluid delivery system in combination with various fluid handling components aligned above a fluid delivery apparatus in accordance with the present invention, the modular fluid delivery apparatus including upper modules, spacers, lower modules and base blocks shown in cross-section.

The present invention relates to delivery apparatus for transporting a fluid to one or more fluid handling components or tools. The fluid delivery apparatus includes a plurality of base blocks which form a base layer on the surface upon which the fluid handling components or tools can be mounted and fluidly connected. The fluid delivery apparatus also includes a plurality of upper modules, a plurality of spacers, and a plurality of lower modules, all of which are received within the respective base blocks to form a fluid delivery apparatus which maximizes adaptability for connection to a variety of fluid handling components while minimizing the number and variety of apparatus components required for connection to the variety of fluid handling components. The upper modules, the spacers, the lower modules, to the base blocks, and the fluid handling components are coupled together to form a fluid delivery system.

The upper modules, the lower modules, and the fluid handling components include fluid passageways which are aligned with one another upon assembling the system. The alignment of these passageways creates one or more extended channels through the upper modules, the lower modules, and the fluid handling components. During operation of the fluid delivery system, a fluid can pass through the extended channel to each of the fluid handling components before being delivered to a tool. Suitable fluids for use within the extended channels are flowable materials such as gasses, liquids, and/or gas/liquid combinations.

When the fluid delivery apparatus is assembled, the passageways within the upper modules and the lower modules terminate either in one or more upwardly directed fluid ports positioned at a horizontal top surface of an upper module or in one or more laterally directed fluid ports positioned adjacent a lateral side of a base block. The upwardly directed fluid ports provide fluid communication to the fluid handling components. The laterally directed fluid ports provide an inlet or an outlet fluid channel of the fluid delivery system for connection with a fluid source or fluid exhaust.

The fluid delivery apparatus in accordance with the present invention is configured such that a fluid handling component may easily be removed from a corresponding module subassembly, that is, a corresponding upper module, spacer, lower module formed by a portion of one or more flow channels, and base block even when the modular subassembly remains assembled. Furthermore, the base blocks of the present invention are configured such that lateral sides of adjacent base blocks need not be in physical contact with one another. Such configuration facilitates minor changes to the fluid delivery apparatus, for example, the replacement of a single module subassembly, without disassembling a large number of modules and/or fluid handling components. In particular, because adjacent modules need not contact one another, a single module subassembly, including a single base block, can be removed from the fluid delivery apparatus without removing adjacent base blocks.

The ability to easily modify the fluid delivery apparatus also reduces the opportunities for systematic contamination. Specifically, the fluid delivery apparatus according to present invention can be quickly repaired or modified. Accordingly, the fluid delivery apparatus of the present invention reduces the time frame for repair or modification within which systematic contamination can occur. Additionally, modifications of the fluid delivery apparatus according to the present invention frequently involve a reduced number of modules, as noted above. Reducing the number of modules involved in a modification reduces the number of contamination sources and, accordingly, the overall opportunity for contamination.

FIG. 1 illustrates an exploded view of the fluid delivery apparatus 50 for fluidly coupling a variety of fluid handling components 51 together to form a fluid delivery system 52. The fluid delivery apparatus 50 includes a plurality of modular subassemblies 55. Each modular subassembly 55 generally includes an upper module 56, a lower module 59, and a base block 60.

Suitable fluid handling components 51 which form fluid delivery system 52 include, but are not limited to, nozzles, inlet ports, outlet ports, pressure gauges, pressure regulators, pressure transducers, filters, purifiers, mixing valves, pneumatic valves, manually operated valves, check valves, flow meters and mass flow controllers, as well as other control and metering components. In operation, the fluid delivery apparatus 50 transports the fluids required for operation of fluid handling components 51 to and/or from fluid handling components 51.

Base blocks 60 are generally configured to be positioned adjacent to a flat surface 61 and can optionally be affirmatively coupled with flat surface 61 to stabilize each base block 60 and corresponding modular subassembly 55 relative to the flat surface 61. Exemplary flat surfaces 61 include, but are not limited to, tabletops & machinery such as the machinery used in semiconductor manufacture. One should appreciate that the flat surface need not be horizontal and can extend at an angle to the horizontal or, alternatively, can extend substantially vertical.

Figure 2:
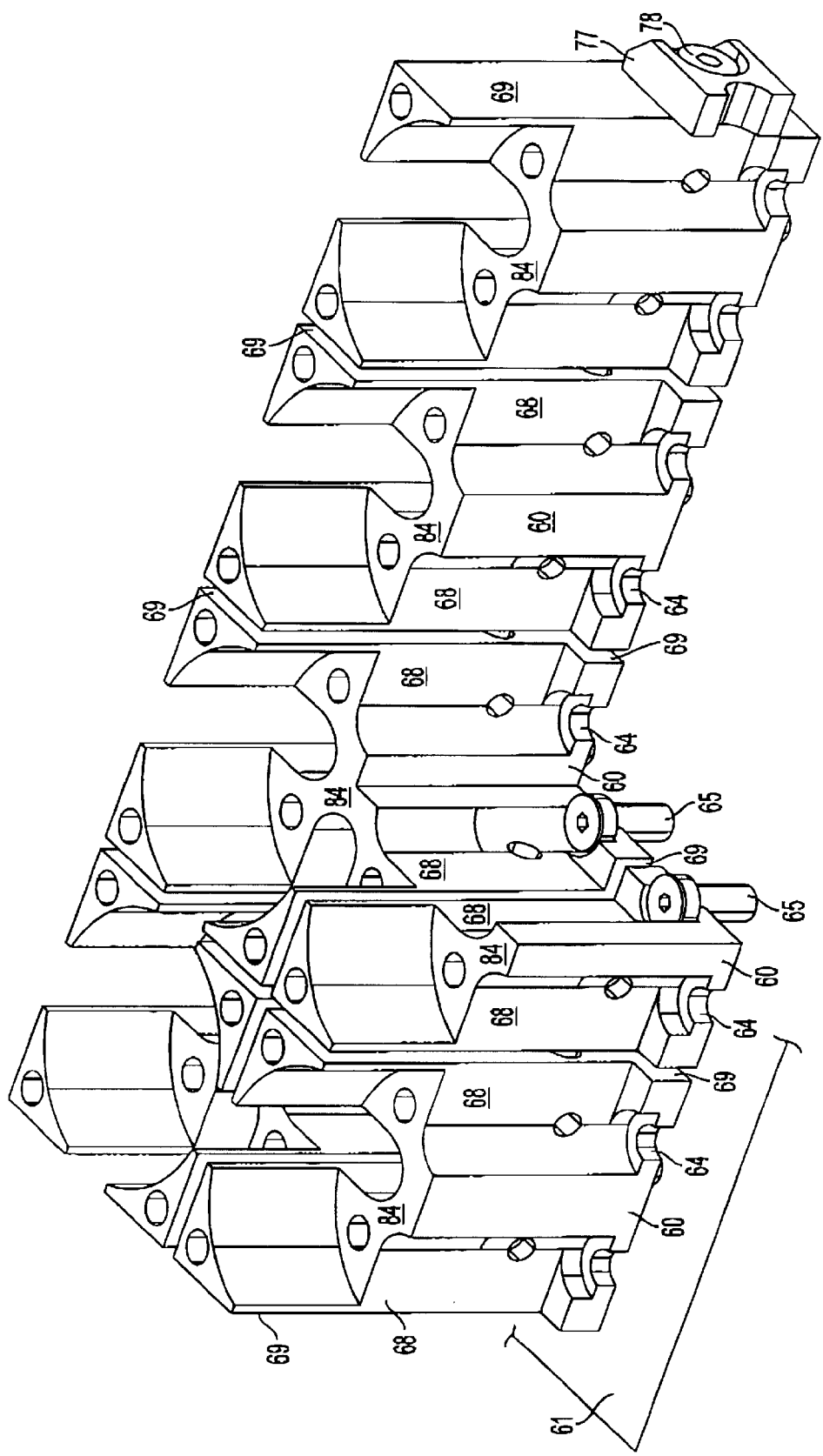
FIG. 2 is a perspective cross sectional view of the base blocks of FIG. 1 arranged in two rows.

Each base block 60 includes a plurality of surface-mounting apertures 64 through which fasteners 65 secure base block 60 to flat surface 61, as shown in FIG. 2. Optionally, fasteners 65 are threaded fasteners and can be used to releasably secure each base block 60 to flat surface 61. One should appreciate that other suitable fasteners can be used. For example, the based blocks can include positioning pins which are received in cooperating positioning bores located in the flat surface. Other fasteners may include nuts, bolts, screws and other suitable fastening means.

Figure 3:
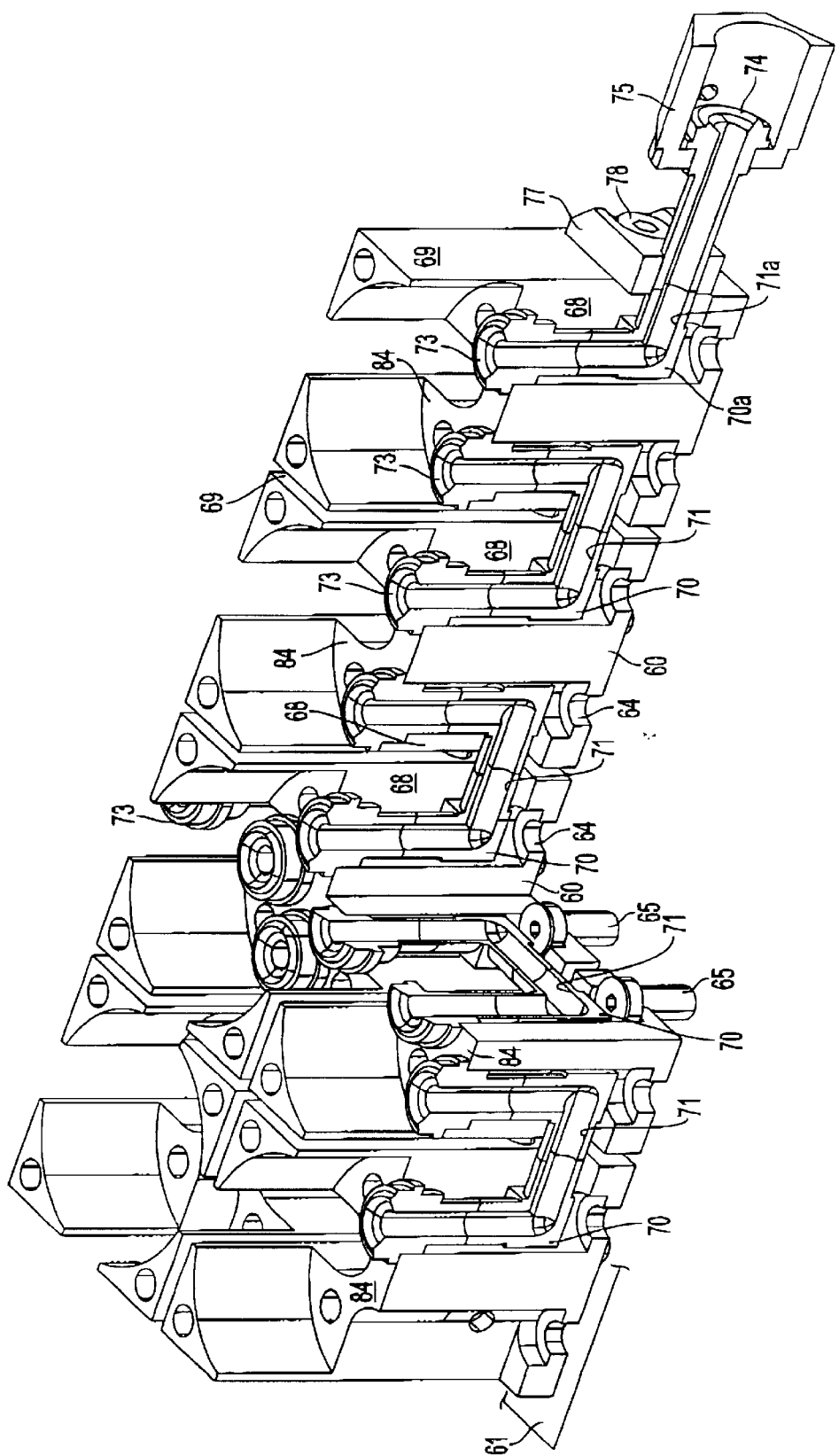
FIG. 3 is a perspective cross sectional view of the lower modules, each formed by a portion of one or more flow channels, installed in the base blocks of FIG. 2.
Figure 4:
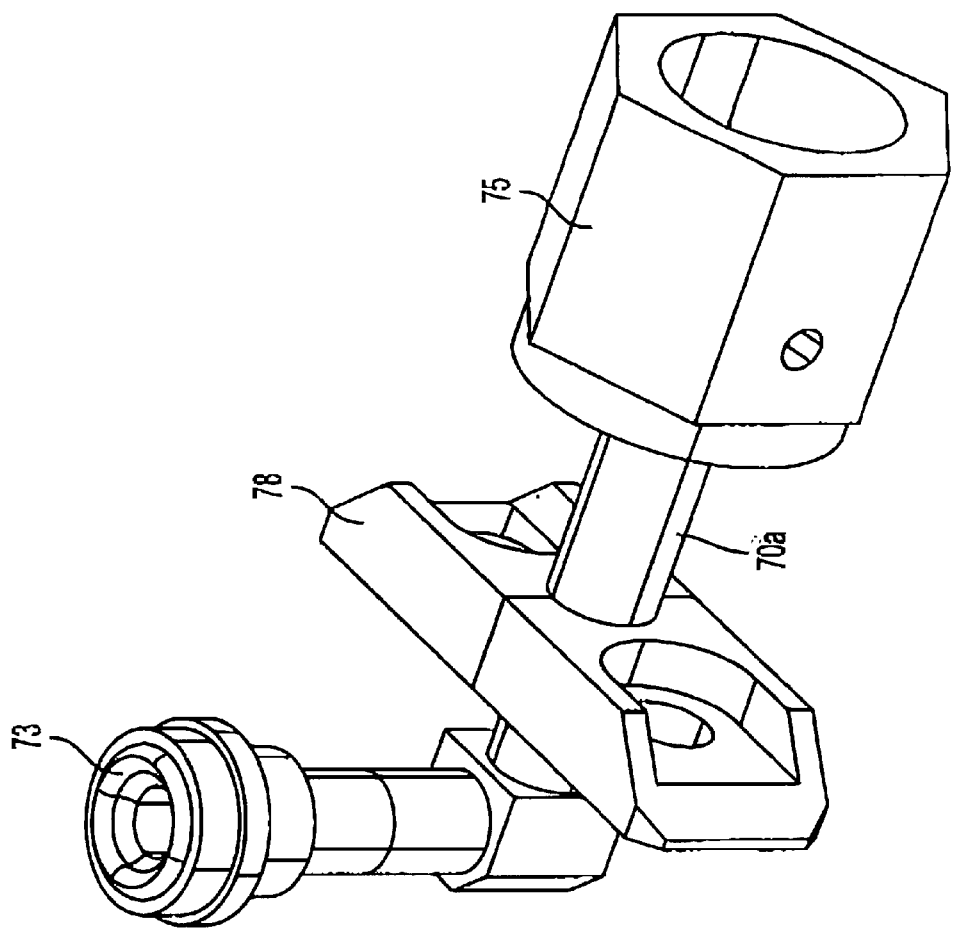
FIG. 4 is an enlarged detailed perspective view of a flow channel and corresponding bracket shown in FIG. 1.

Each base block 60 includes one or more base block channels 68, as shown in FIG. 3. The illustrated base block 60 in accordance with the present invention includes four lateral sides 69 and four base block channels 68 which correspond to the four lateral sides of base block 60. Base block channels 68 open upwardly thus allowing installation of lower module 59 while the based blocks 60 are secured to flat surface 61.

One should appreciate that base block 60 may have other shapes and configurations. For example, instead of having four lateral sides 69, the base block may have six lateral sides whereby a plurality of base blocks may be arranged in a honeycomb configuration. In such a configuration, each base block can include six base block channels, one for each lateral side.

As shown in FIG. 3, lower module 59 includes one or more flow channels 70, each flow channel 70 having a lower passageway 71 extending therethrough. Lower passageway 71 of each flow channel 70 terminates in one or more upper-module-coupling ports 73 and/or terminates in an inlet/outlet-coupling port 74. Upper-module-coupling ports 73 extend substantially vertically and inlet/outlet-coupling port 74 extends substantially horizontally, however, one should appreciate that other geometries may be used. For example, an inlet/outlet coupling port can be configured to extend parallel to upper-module-coupling ports 73. Alternatively, upper-module-coupling ports and/or the inlet/outlet-coupling ports may extend at an acute angle relative to flat surface 61. Optionally, ports 73 and 74 have conventional fittings such as the microfittings manufactured by the Swagelok Company of Solon, Ohio. One should appreciate that other fluid fittings and fitting means can also be used to fluidly connect ports 73 and 74.

In order to provide fluid communication between adjacent subassemblies 55 and through adjacent base blocks 60, a flow channel 70 is inserted into the base block channel 68 of two adjacent base blocks 60 such that flow channel 70 extends outwardly from base block channel 68 of one base block into base block channel 68 of the adjacent base block thereby extending two adjacent base blocks 60 in such a manner to straddle two corresponding and adjacent upper modules 56.

In order to provide fluid communication between fluid delivery apparatus 50 and a fluid delivery source or exhaust, a flow channel 70a is inserted into base block channel 68 of one base block 60 such that flow channel 70a extends outwardly from base block channel 68 and terminates in inlet/outlet coupling port 74. A threaded inlet/outlet-coupling port fastener 75 or other suitable means is used to selectively engage inlet/outlet coupling port 74 with the fluid delivery source or exhaust. In this situation, a bracket 77 releasably secures flow channel 70a to base block 60. A fastener 78 can be used to releasably affix bracket 77 to a lateral side 69 of base block 60. Optionally, bracket fastener 78 is threaded, however, one should appreciate that other suitable fasteners can be used including pins, nuts, bolts, screws, and other suitable fastening means.

Figure 5:
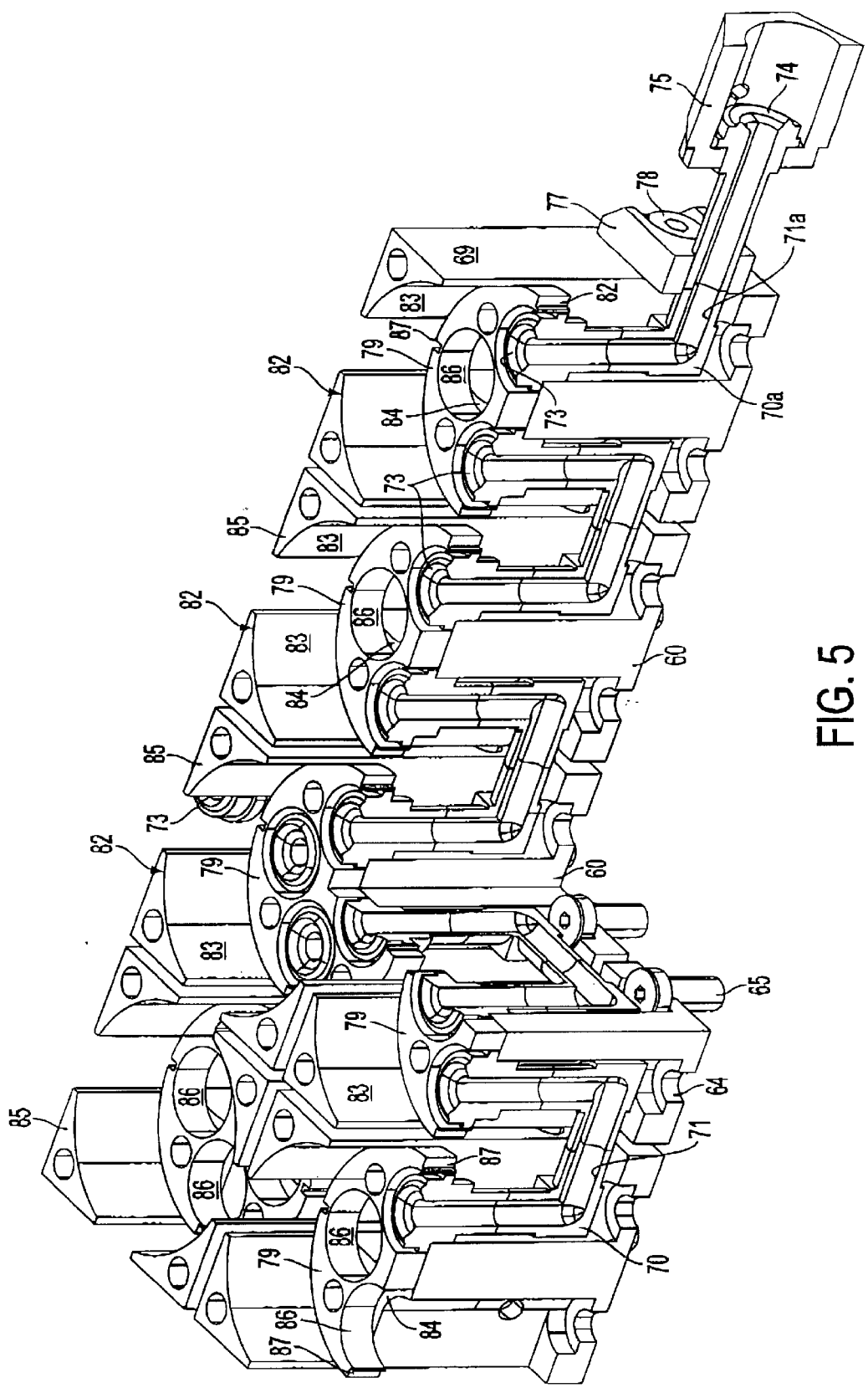
FIG. 5 is a perspective cross sectional view of the spacers and lower modules installed in the base blocks of FIG. 2.

A spacer 79 is inserted within a receptacle 82 formed by inner walls 83 and bottom wall 84 of each base block 60 below a top surface 85 of base block 60, as shown in FIG. 5. Similar to base block channels 68 discussed above, receptacle 82 opens upwardly thus allowing installation of flow channels 70, 70a of the lower module, as well as spacer 79 and upper module 56, even when base block 60 is secured to flat surface 61.

Spacer 79 includes one or more alignment apertures 86 for properly aligning upper-module-coupling port 73 with respect to base block 60. The illustrated spacer 79 includes four alignment apertures 86 which correspond in number to the number of base block channels 68 in each base block 60. One should appreciate that the actual number of alignment apertures may vary, for example, the spacer can include six alignment apertures in the event that a respective base block has six lateral sides. Alternatively, the spacers can include just one, two, three or more alignment apertures if so desired.

Spacer 79 has a substantially cylindrical shape which is complementary to that of base block receptacle 82. One should appreciate that spacer 79 and base block receptacle 82 can have other geometries. For example, the spacer and the receptacle can have a complementary square or rectangular shape which would also provide the means to properly align the flow channels with respect to the base block. Alternatively, the spacer and the receptacle can have complementary triangular, pentagonal, or hexagonal shapes, particularly in the event that the base block has, three, five, or six lateral sides, respectively.

Optionally, spacer 79 includes indexing grooves 87 which cooperate with indexing splines or nibs located within base block receptacle 82. Indexing grooves 87 facilitate alignment of spacer 79 within receptacle 82 relative to base block 60, which in turn facilitate alignment of flow channels 70 with respect to base block 60 and upper module 56 when modular subassembly 55 is assembled.

Figure 6:
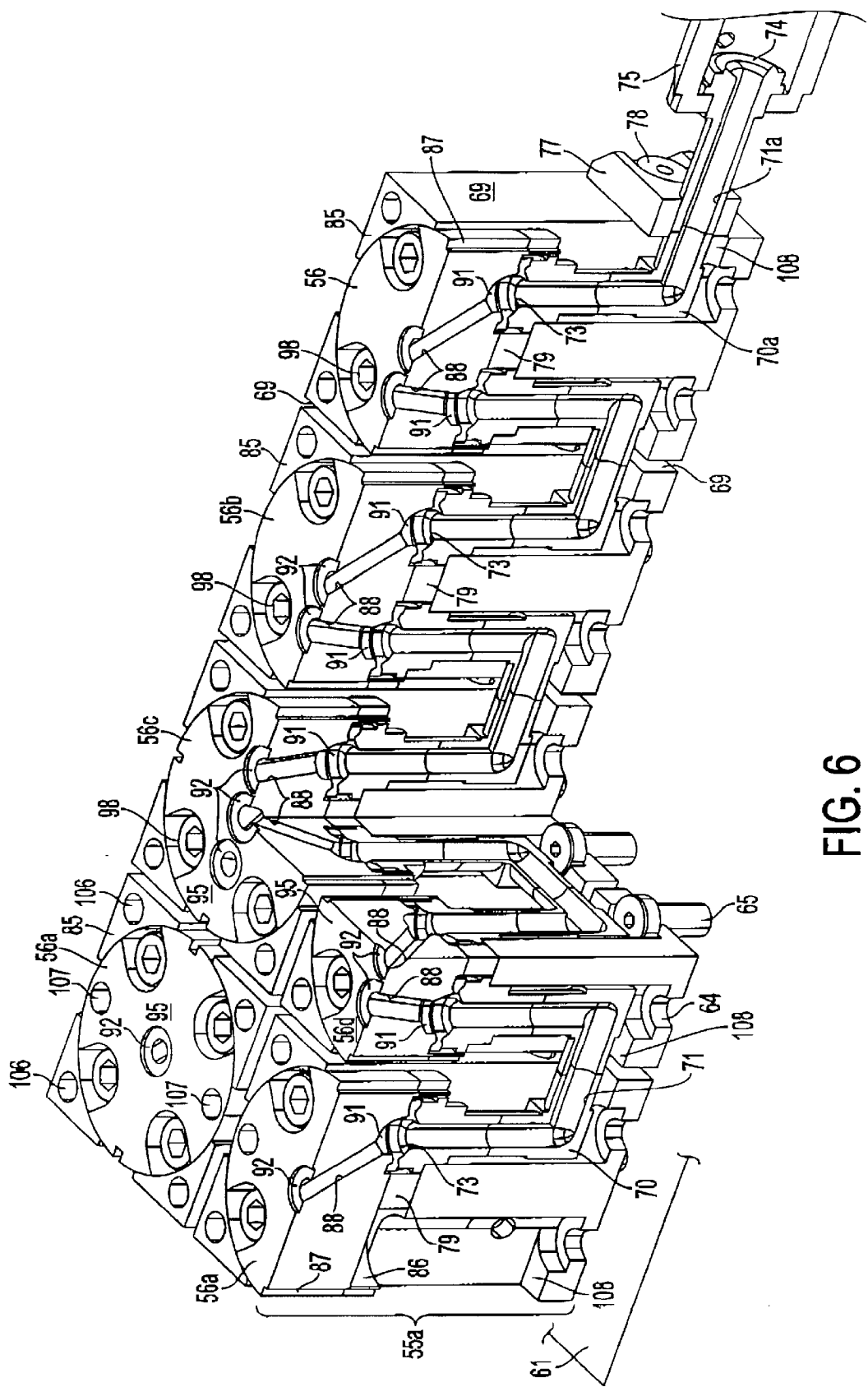
FIG. 6 is a perspective cross sectional view of the upper modules, spacers and lower modules installed in the base blocks of FIG. 2.

An upper module 56 is inserted within receptacle 82 above spacer 79, as shown in FIG. 6. Because receptacle 82 opens upwardly, upper module 56 may be easily installed and removed from base block receptacle 82 even when a base block 60 is secured to flat surface 61.

Upper module 56 includes one or more upper passageways 88. Each upper passageway 88 terminates in one or more lower-module-coupling ports 91 and/or in one or more fluid-handling-component ports 92. As shown in FIG. 6, upper passageways 88 optionally extend from a bottom side 94 to a top side 95 of upper module 56. The actual number and configuration of upper passageways 88 will vary depending upon the actual configuration of the respective fluid handling component 51 and the number of flow channels 70 which must be in fluid communication with the fluid handling components 51. For example, FIG. 6 shows several types of upper modules 56, 56a, 56b, 56c, and 56d, each of which includes a distinct configuration of one, two, three, or four passageways 88. It is noted that like reference numerals have been used to describe like components of the present invention.

Figure 7:
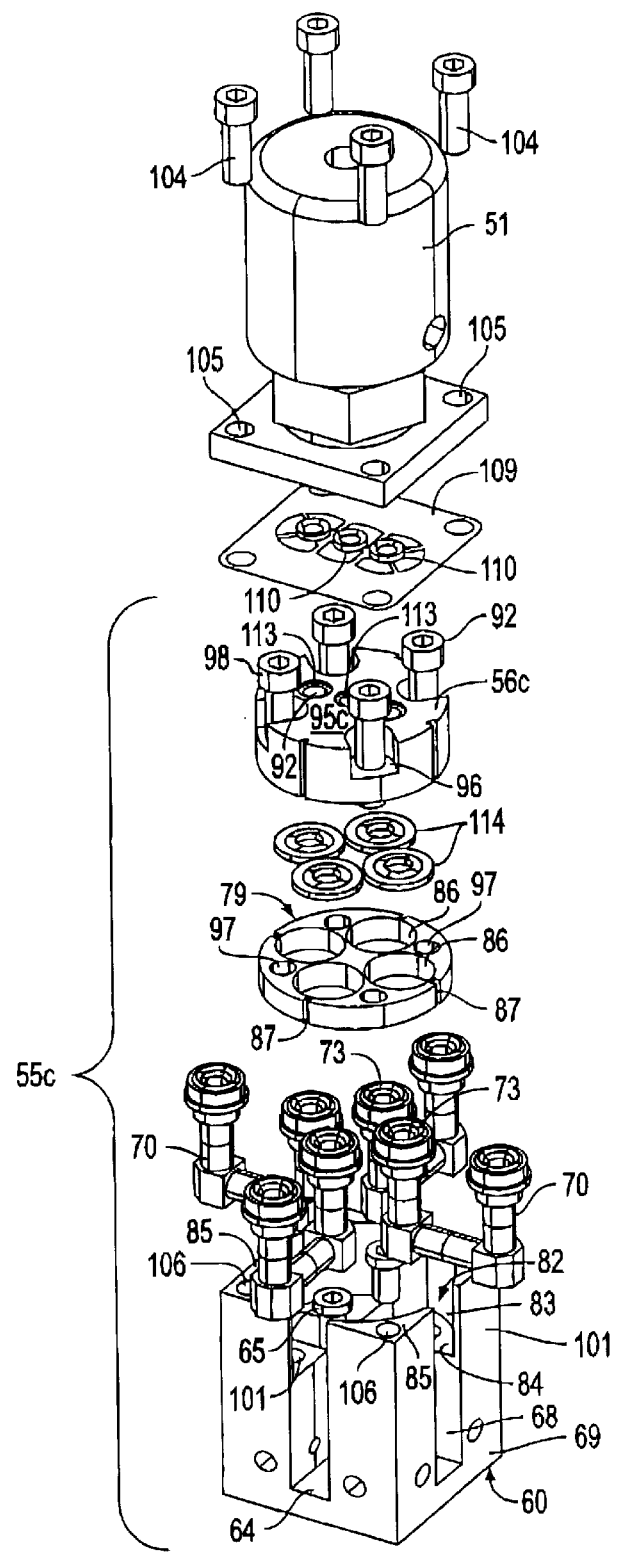
FIG. 7 is an exploded perspective view of one modular subassembly shown in FIG. 6 including an upper module, spacer, lower module and base block in combination with a fluid handling component.

As shown in FIG. 7, upper module 56c and spacer 79 each include one or more subassembly apertures 96 and 97, respectively. One or more subassembly fasteners 98 extend through apertures 96 and 97 of upper module 59 and spacer 79, respectively, and into base block 60 to releasably secure upper module 56c and spacer 79 to base block 60. Preferably fastener 98 is a threaded fastener which cooperates with a threaded bore 101 located in bottom wall 84 of base block receptacle 82. Again, one should appreciate that other suitable fasteners and fastening means can be used.

As fastener 98 is turned to tighten upper module 56c against spacer 79 and base block 60, each flow channel 70 of lower module 59 seats against upper module 56 and is releasably secured between upper module 56c and base block 60 Optionally, spacer 79 is dimensioned and configured such that over-tightening of fastener 98 can not damage the fluid joint formed between upper-module-coupling ports 73 and lower-module-coupling ports 91.

Figure 8:
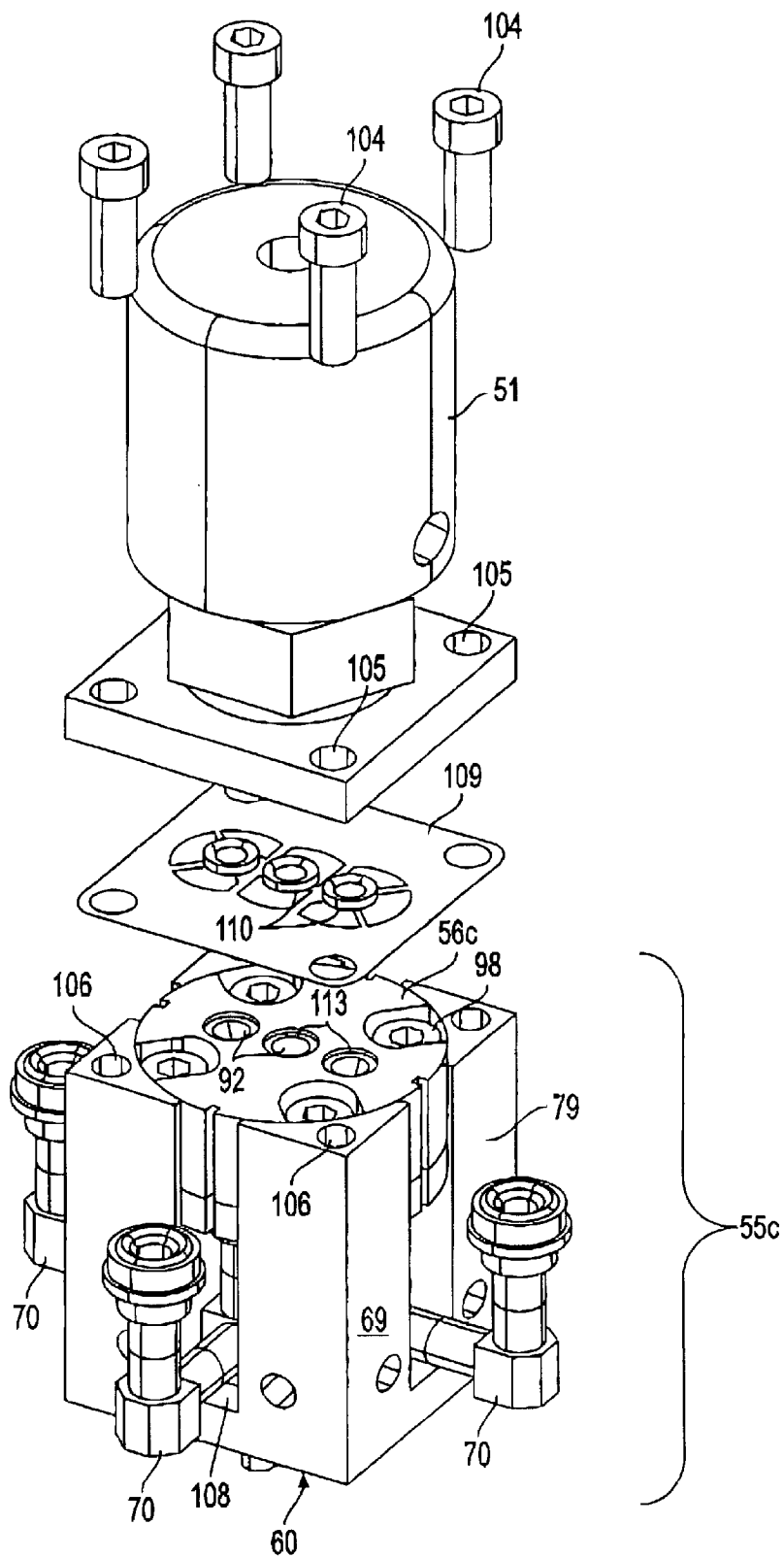
FIG. 8 is a partially exploded perspective view similar to FIG. 7 but showing the modular subassembly assembled.
Figure 9:
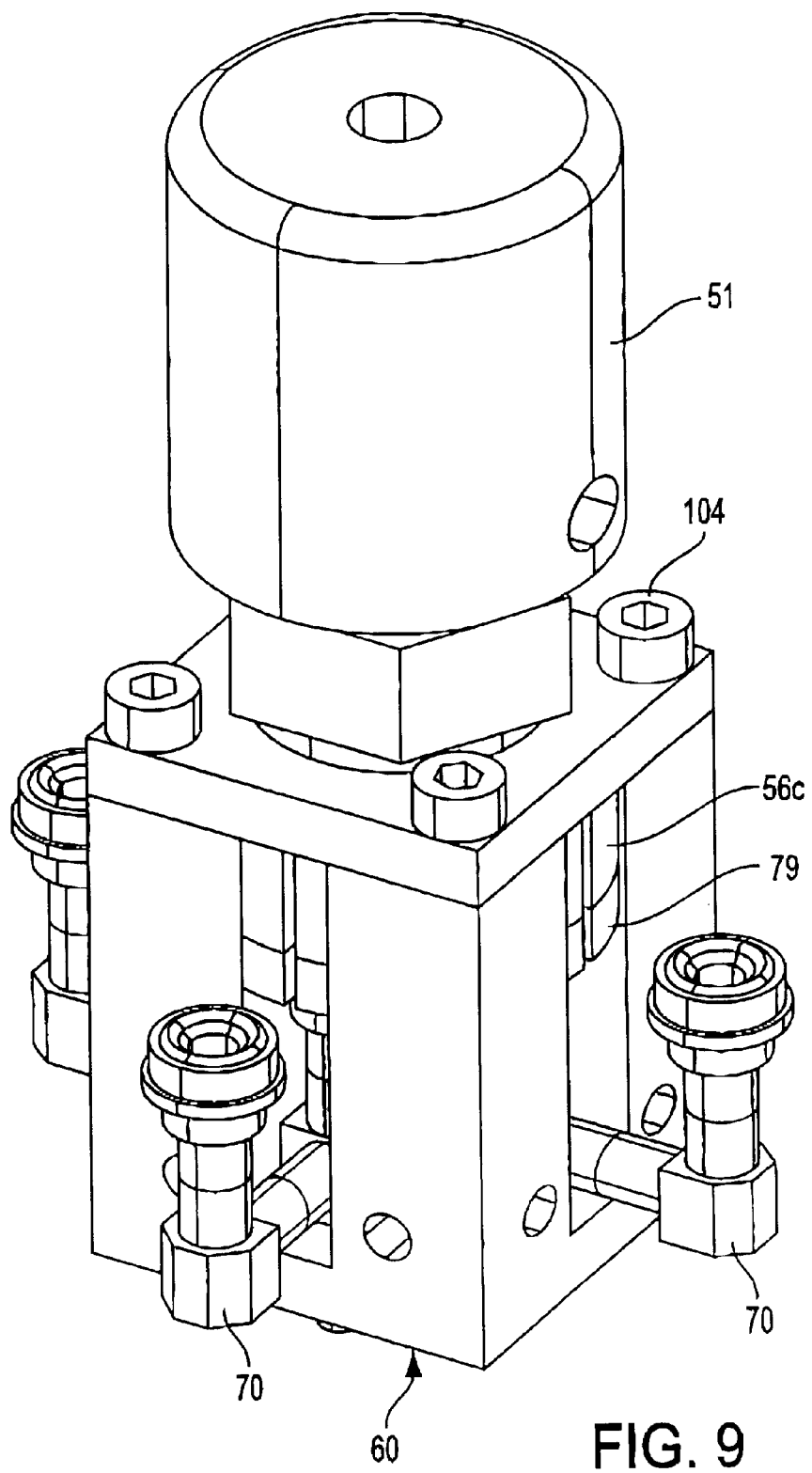
FIG. 9 is a perspective view similar to FIGS. 7 and 8 but showing the subassembly assembled with the valve component.

Fluid delivery apparatus 50 further includes one or more assembly fasteners 104 for attaching a fluid handling component 51 to a respective modular subassembly 55, as shown in FIGS. 7–9. Optionally assembly fastener 104 is a threaded fastener which passes through a component assembly bore 105 and cooperates with a threaded base block assembly bore 106 located on top surface 85 of base block 60. In addition to, or instead of, base block assembly bore 106, an upper module, for example, upper module 56a, can include a threaded upper module assembly bore 107 in which a fastener 104 is threaded. Again, one should appreciate that other suitable fasteners and fastening means can be used.

Although top surface 85 and the bottom surface of the illustrated base blocks have substantially flat surfaces, the base blocks can optionally have shape, contour and/or texture. For instance, the bottom wall of the base block receptacle can have a contour which is complementary to a bottom side of the spacer. The contour can be interlocking to provide an affirmative grip between either the base block and the spacer.

Fluid delivery apparatus 50 can be disassembled and can be reassembled to provide fluid delivery apparatus 50 with a different configuration or to change the fluid handling components 51 being used in combination with fluid delivery apparatus 50 thereby providing fluid delivery system 52 with a different configuration. With reference to FIGS. 7–9, various methods for assembling the fluid delivery apparatus 50 on a flat surface 61 can be used. In one method in accordance with the present invention, base blocks 60 are attached to flat surface 61 with four fasteners 65. Each fastener 65 is passed through an unthreaded aperture 64 in base block 60 and is then received in a threaded aperture in flat surface 61. Once a fastener 65 is received in a threaded aperture, fastener 65 can be turned in order to tighten and loosen base block 60 on flat surface 61. Unthreaded apertures 64 are countersunk so the top of fastener 65 is positioned even with or below a bottom surface 108 of channel 68 of base block 60 when base block 60 is tightened onto flat surface 61. Such positioning of fastener 65 relative to base block 60 allows flow channel 70 of the lower module to be positioned immediately adjacent bottom channel surface 108 of base block 60.

After the appropriate base blocks 60 are in place on flat surface 61, the appropriate flow channels 70, 70a of the lower modules are inserted into respective base block channels 68. Next, a spacer 79 is inserted into each receptacle 82 of each base block 60 thereby aligning upper-module-coupling ports 73 of each flow channel with respect to the base block 60. Next, appropriate upper modules 56c are inserted into each receptacle above spacers 79 and secured to the base blocks 60 by four subassembly fasteners 98. Each subassembly fastener 98 is passed through an unthreaded aperture 96 in upper module 56c, through an unthreaded aperture 97 in spacer 79, and is received in a threaded aperture 101 in base block 60, as shown in FIG. 7. Fastener 65 can be turned in order to tighten upper module 56c against spacer 79 and base block 60. Optionally, unthreaded apertures 96 of upper module 56c are countersunk with respect to upper surface 96 of upper module 56c thus allowing fluid handling component 51 to be positioned immediately adjacent the top side 95 of upper module 56c.

Once the upper modules 56c are in place, the fluid handling components 51 are coupled with the appropriate module subassembly 55 using four assembly fasteners 104. Assembly fasteners 104 are passed through an unthreaded aperture 105 in fluid handling component 51 and are then received in a threaded aperture 106 in base block 60 as shown in FIG. 7. Fastener 104 can then be turned to tighten or loosen fluid handling component 51 with respect to modular subassembly 55.

Optionally, a component gasket 109 can be positioned between fluid handling component 51 and subassembly 55 before fluid handling component 51 is coupled with subassembly 55. Gasket 109 can be made from a plurality of suitable materials including, but not limited to, a metal such as 316L stainless steel and other materials suitable for fluid handling and/or clean room use. Gasket 109 can include one or more, or as illustrated, three discrete component sealing devices 110 such as an O-rings or other suitable device. Additionally, component sealing devices 110 can be independent of gasket 109. As shown in FIG. 7, top side 95 of upper module 56c includes a component gasket recess 113 positioned adjacent to fluid-handling-component port 92. Component gasket recess 113 has a shape configured for receiving component sealing device 110.

Figure 14:
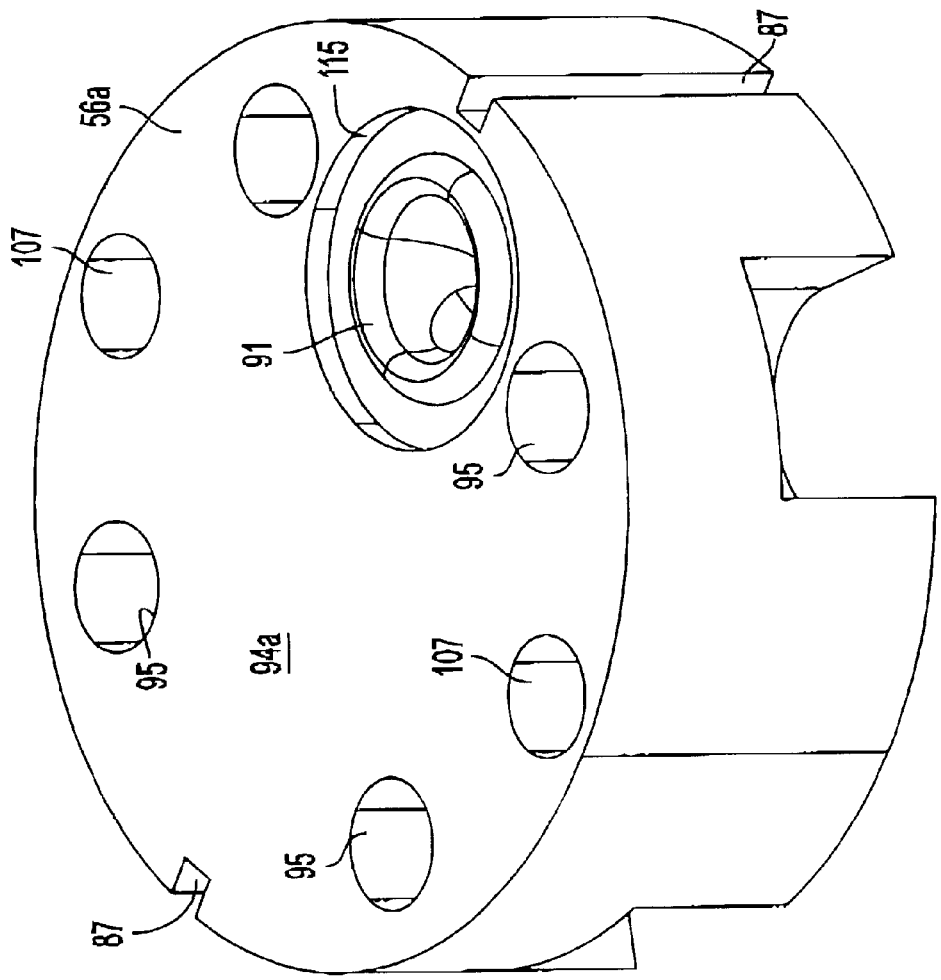
FIG. 14 is an enlarged detailed perspective view of a bottom of the second upper module shown in FIGS. 6 and 13.

Similarly, a passageway sealing device or gasket 114 can be positioned between upper module 56c and each flow channel 70, 70a before upper module 56c is coupled with base block 60, as shown in FIG. 7. Passageway sealing device 114 can be made from a plurality of materials including, but not limited to, a metal such as 316L stainless steel and other materials suitable for fluid handling and/or clean room use. Optionally, the passageway sealing device is an O-ring. As shown in FIG. 14, bottom side 94 of upper module 56a includes a gasket recess positioned adjacent to fluid-handling-component port 92. One or more passageway gasket recesses 115 are positioned on bottom side 94 of upper module 56a and have a shape for receiving a passageway sealing device 114.

The sealing devices are compressed when the fluid handling component 51 is tightened against upper module 56c by turning assembly fasteners 104. This compression of the sealing devices forms a seal between the corresponding fluid ports of fluid handling component 51 and upper module 56c as well as the corresponding fluid ports of upper module 56c and flow channels 70, 70a of the lower module. One should appreciate that other types of gaskets, seals and sealing means can be used. One should appreciate that the fluid delivery apparatus of the present invention can instead be configured such that gaskets, sealing devices, and/or other sealing means need not be used.

Additionally, the base blocks do not require threaded apertures for assembly of the modular subassemblies. For instance, the fluid handling components, the upper modules, and base blocks can include unthreaded apertures which are aligned with one another when the fluid delivery apparatus is assembled. A subassembly fastener can be passed through the aligned unthreaded apertures in the fluid handling component, the upper module, spacer, and base block and into a threaded aperture in flat surface 61. Alternatively, the aperture in flat surface 61 can also be unthreaded in which case a bolt is passed through the aligned unthreaded apertures in the fluid handling component, upper module, spacer, base block, and flat surface and be releasably secured thereto by a nut.

The above discussion with respect to assembly and disassembly of fluid delivery apparatus 50 is for illustrative purposes only. The method of assembly and disassembly of the fluid delivery apparatus may vary. For instance, the number of subassembly fasteners per module is not limited to four and can be as few as one. Further, a spacer need not be used in accordance with the present invention provided that the base flock is designed and configured such that the base block channels align the flow channels with respect to the upper module. Alternatively, a modified spacer can be used for heating the fluid passageways in the upper module and/or lower module. For example, a spacer can be provided with a thin film heater bonded to a top and/or bottom surface thereof in order to apply heat to the upper module and/or lower module as desired.

Figure 10:
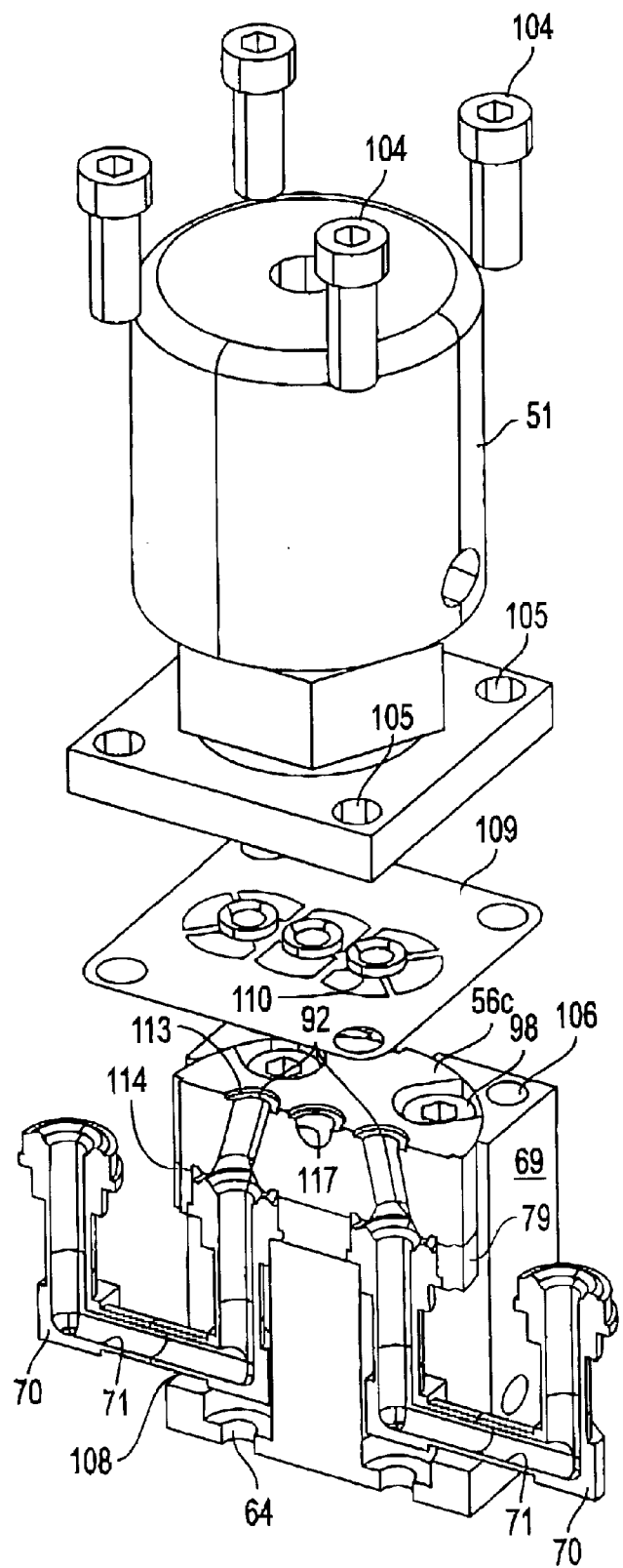
FIG. 10 is a partially exploded perspective view of another modular subassembly, in cross-section, similar to that shown in FIG. 8 in combination with the fluid handling component shown in FIG. 8.

As noted above, the actual number and configuration of upper passageways 88 will vary depending upon the actual configuration of the respective fluid handling component 51 and the number of flow channels 70 which must be in fluid communication with fluid handling component 51. In one embodiment in accordance with the present invention shown in FIG. 10, upper module 56e is similar to the upper modules illustrated in FIG. 6 but having a modified upper passageway configuration. It is noted that like reference numerals have been used to describe like components of the present invention. Upper module 56e includes upper passageways 88 which extend from diametrically opposed upper-module-coupling ports 73, 73, through upper module 56e and to diametrically oppose fluid-handling-component ports 92, 92. Centrally located fluid-handling-component closure port 117 does not extend through upper module 56e or communicate with a lower passageway 71 of any flow channel 70. Thus, closure port 117 effectively seals a corresponding fluid port on fluid handling component 51.

Figure 11:
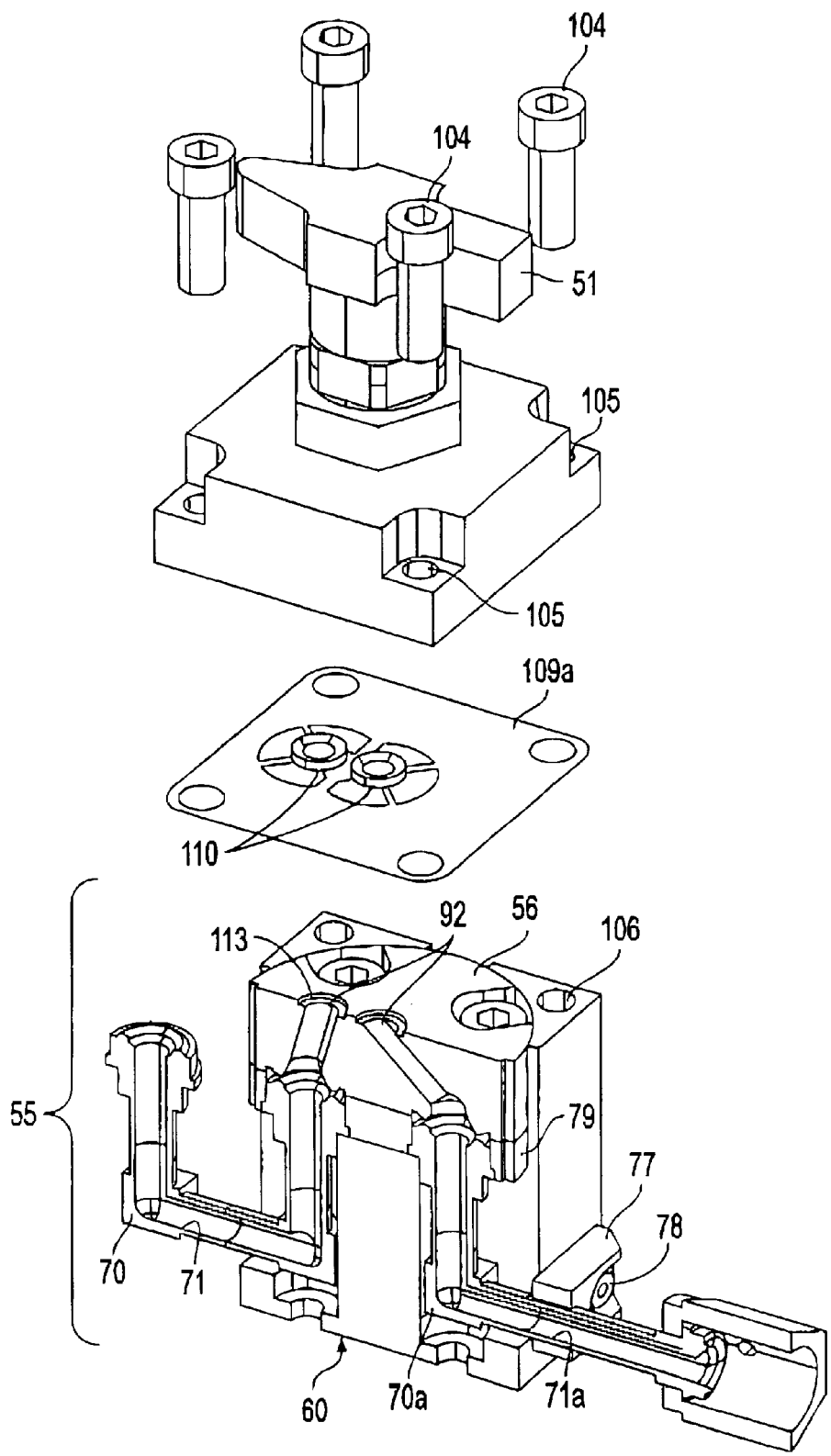
FIG. 11 is a partially exploded perspective view of another modular subassembly shown in FIGS. 1 and 6, in cross-section, in combination with another fluid handling component shown in FIG. 1.
Figure 12:
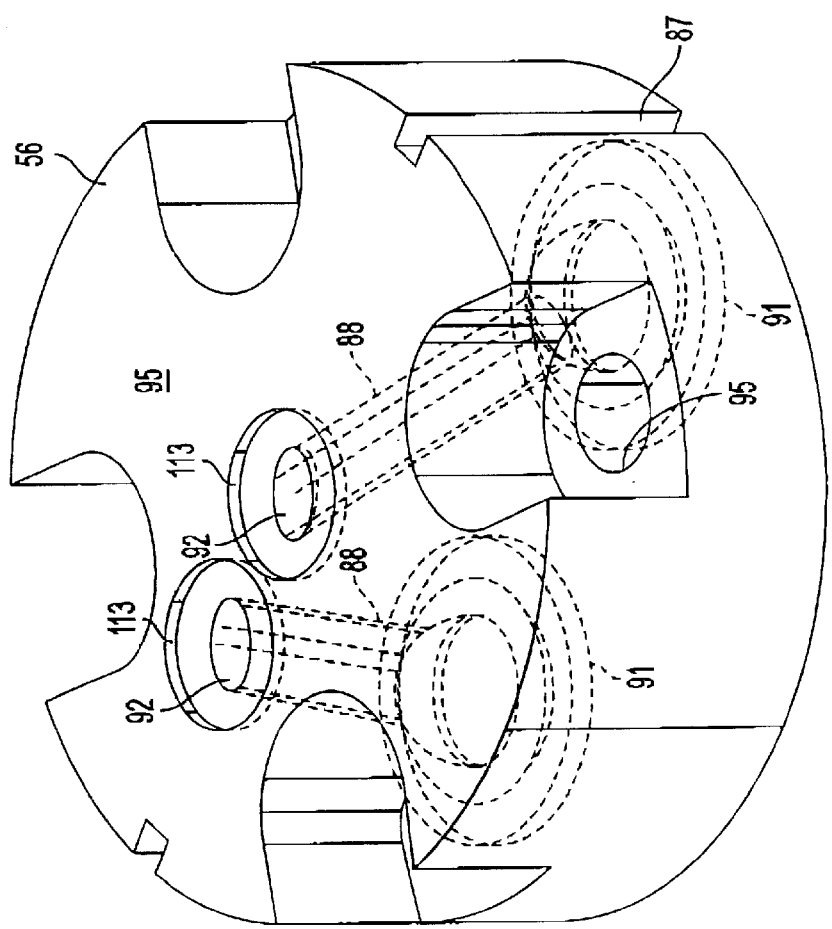
FIG. 12 is an enlarged detailed perspective view of a first upper module shown in FIG. 6.

FIG. 11 shows an assembled modular assembly 55 including upper module 56, also shown in FIG. 5, having two upper passageways 88 which extend from diametrically opposed lower-modular-coupling ports 91, through upper module 56, and to two fluid-handling-component-coupling ports 92, one of which is centrally located on the top side 95 of upper module 56. Upper module 56 is also illustrated in FIG. 14. FIG. 11 also illustrates the adaptability of fluid delivery apparatus in that the assembled modular subassembly 55 is shown ready for attachment to a different type of fluid handling component 51, namely a valve component.

Figure 13:
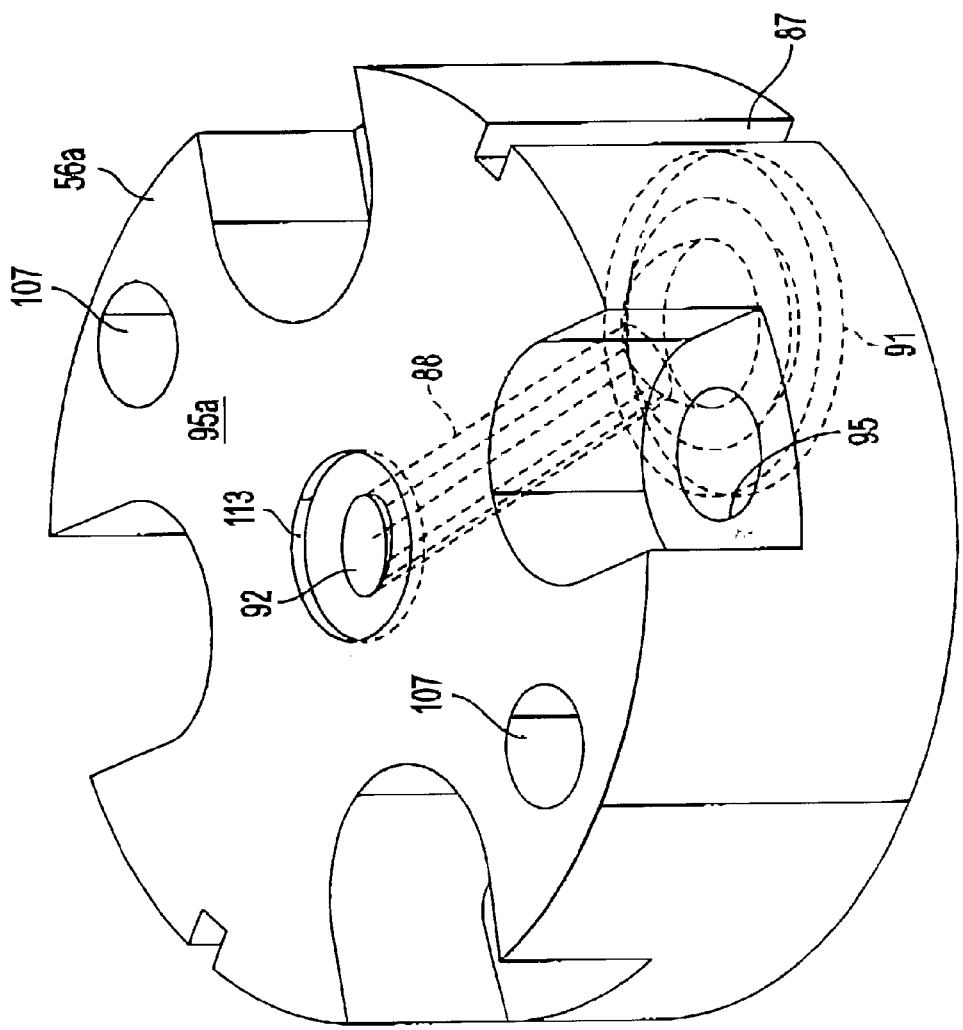
FIG. 13 is an enlarged detailed perspective view of a second upper module shown in FIG. 6.

FIG. 13 shows an upper module 56a, also shown in FIG. 5, having a single upper passageway 88 which extends from one lower-modular-coupling port 91, through upper module 56a, and to one fluid-handling-component coupling port 92, which is centrally located on the top side 95a of upper module 56a. FIG. 14 shows the bottom side 94a of upper module 56a.

Figure 15:
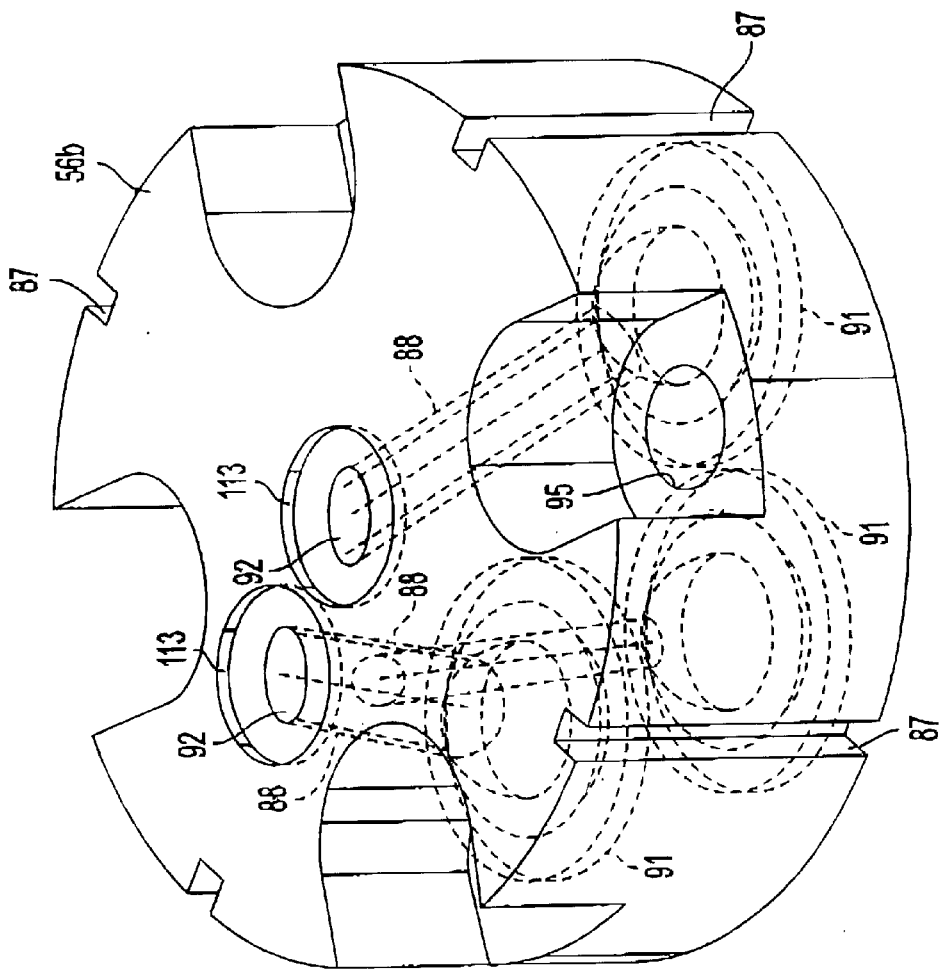
FIG. 15 is an enlarged detailed perspective view of a third upper module shown in FIG. 6.

FIG. 15 shows an upper module 56b having three upper passageways 88. One upper passageway 88 extends from a lower-modular-coupling port 91, through upper module 56b, and to a first centrally located fluid-handling-component-coupling port 92. The two remaining upper passageways extend from a second and third adjacent lower-modular-coupling ports 91, through upper module 56b, and to a single fluid-handling-component-coupling port 92 adjacent to the first centrally located port.

Figure 16:
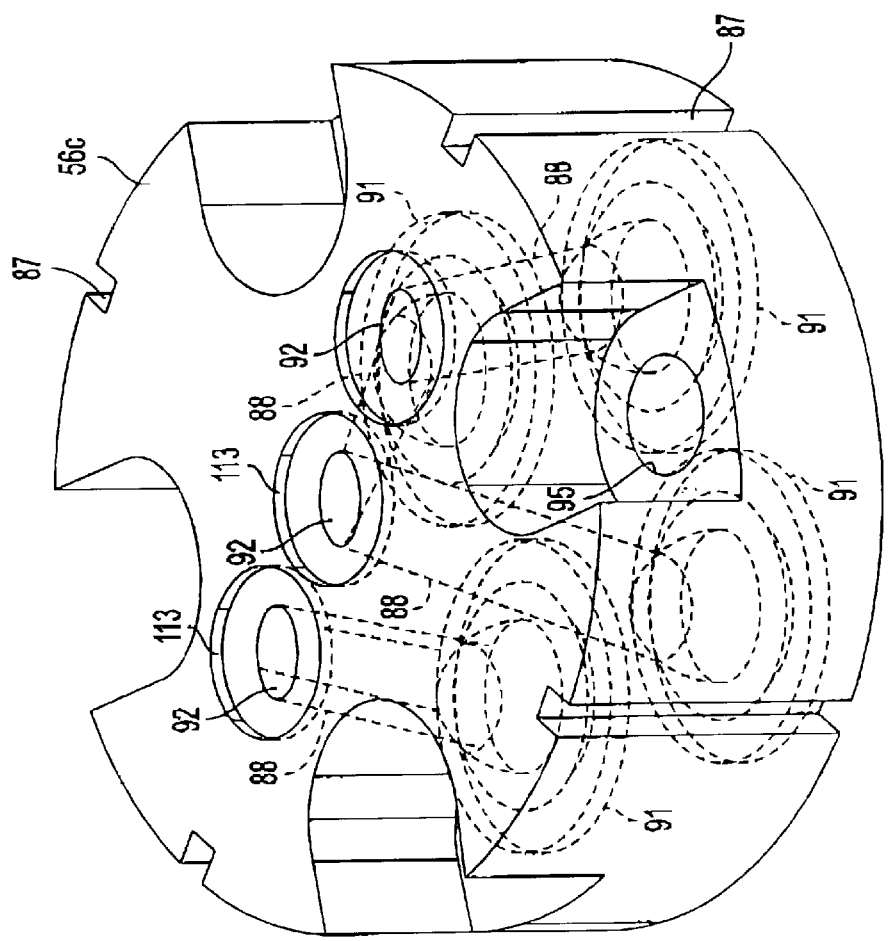
FIG. 16 is an enlarged detailed perspective view of a fourth upper module shown in FIG. 6.

FIG. 16 shows an upper module 56c having four upper passageways 88. A first and a second upper passageway 88 of upper module 56c extend from a first and a second diametrically opposed lower-module-coupling port 91, respectively, though upper module 56c, and to a first centrally located fluid-handling-component-coupling port 92. Third and fourth upper passageways 88 extend from third and fourth diametrically opposed lower-module-coupling ports 91 to second and third fluid-handling-component-coupling ports 92 located adjacent the first centrally located port. One should appreciate that two adjacent lower-module-coupling ports can be fluidly connected to a single fluid-handling-component-coupling port. Upper module 56c is also shown in FIG. 5.

Figure 17:
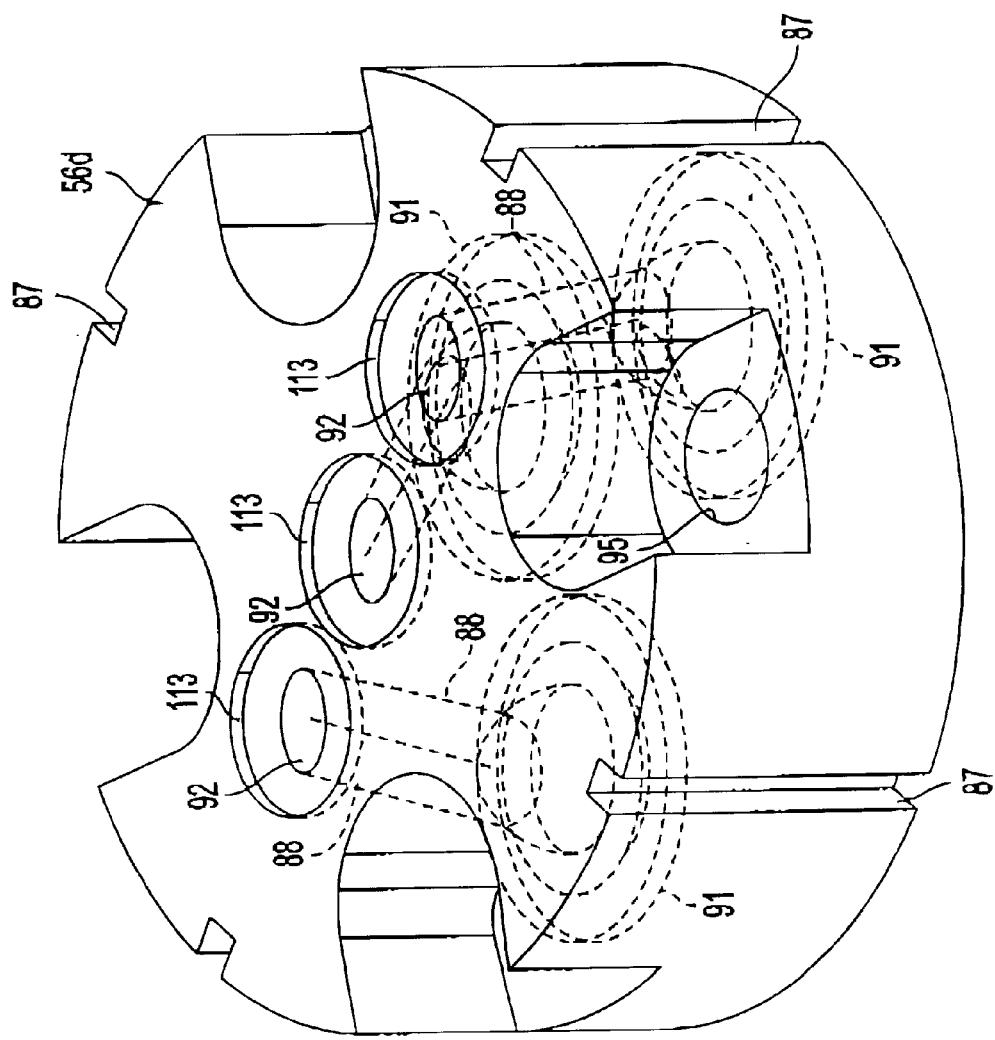
FIG. 17 is an enlarged detailed perspective view of a fifth upper module shown in FIG. 6.

FIG. 17 shows an upper module 56d having three upper passageways 88, each extending from a first, second and third lower-modular-coupling port 91, through upper module 56d, and to a first centrally located fluid-handling-component-coupling port 92 and two adjacent but diametrically opposed fluid-handling-component-coupling ports 92. Upper module 56d is also shown in FIG. 5.

Figure 18:
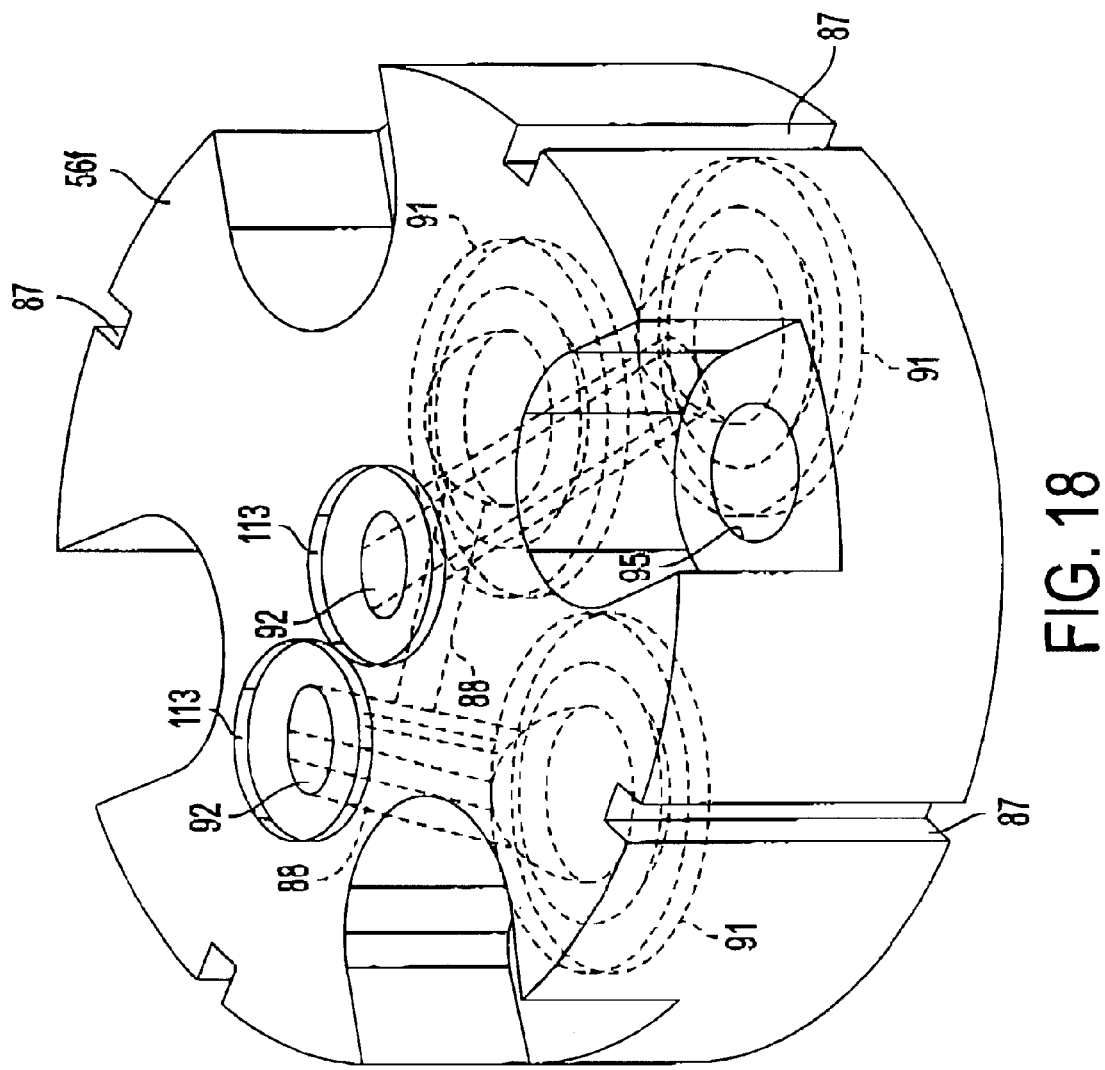
FIG. 18 is an enlarged detailed perspective view of a sixth upper module similar to those shown in FIG. 6.

FIG. 18 shows an upper module 56f having three upper passageways 88 similar to upper module 56b, however, upper module 56f is the mirror image of upper module 56b. One upper passageway 88 of upper module 56f extends from a lower-modular-coupling port 91, through upper module 56f, and to a first centrally located fluid-handling-component-coupling port 92. The two remaining upper passageways extend from a second and third adjacent lower-modular-coupling ports 91, through upper module 56f, and to a single fluid-handling-component-coupling port 92 adjacent to the first centrally located port.

Suitable materials for upper modules 56, spacers 79, flow channels 70, and base blocks 60 include, but are not limited to, stainless steel such as 316L VIM/VAR. Because the spacers and the base blocks do not contact the fluid, spacer 79 and base block 60 can also be fabricated from other materials such as plastic, metal including steel, aluminum, and various alloys, teflon and other suitable materials selected to minimize weight and cost of fabrication. One should appreciate that when fluid delivery apparatus 50 is used in certain semiconductor manufacturing processes, upper module 56, spacers 79, flow channels 70, and base blocks 60 are preferably formed of materials which are clean room compatible.

Base blocks 60 generally have a length of about 1–2 inches, a width of about 1–2 inches and a height of about 1–3 inches. Upper modules 56 generally have a diameter of about 1–2 inches and a height of about ¼ to 1½ inches. Similarly, spacers 79 generally have a diameter of about 1–2 inches and a height of about ¼ to 1½ inches. Flow channels are generally U-shaped or L-shaped and generally have a length of 1–2 inches and a height of about ½ to 1½ inches. However these shapes and dimensions can vary extensively. For example, the shape of the flow channels can include V-shapes, I-shapes, J-shapes, and other suitable geometries. Furthermore, the length of the base blocks can be varied to accommodate fluid handling components which have bases with unusual geometries. Similarly, the upper module can be varied to accommodate fluid handling components having fluid ports which are unusually far apart. A suitable width for the passageways includes, but is not limited to, approximately ⅛ to ¼ inch, and more particularly, approximately 0.18 inches. The fluid ports can include a standard C-seal to be positioned between an upper module and a corresponding fluid handling component and a ¼ inch face seal gasket to be positioned between adjacent fluid handling components.

While the present invention is disclosed by reference to the preferred embodiments and examples detailed above, it is to be understood that these examples are intended in an illustrative rather than limiting sense, as it is contemplated that modifications and combinations will readily occur to those skilled in the art, which modifications and combinations will be within the spirit of the invention and the scope of the appended claims.

What is claimed is:

1. A fluid delivery apparatus for transporting a fluid to one or more fluid handling components, said apparatus comprising:

an upper module including an upper passageway, the upper module configured to be coupled with a fluid handling component such that said upper passageway is in fluid communication with the fluid handling component;

a lower module including a lower passageway, the lower module configured to be coupled with the upper module such that the lower passageway is in fluid communication with the upper passageway;

a base block including a receptacle and a channel, the upper module received within the receptacle and the lower module extending through the channel; and wherein the upper module has a substantially cylindrical shape and includes one or more subassembly apertures sized to receive one or more fasteners extending therethrough and into the base block to releasably secure the upper module to the base block.

2. The fluid delivery apparatus of claim 1, wherein the upper module further comprises a top side including a flat portion which is configured to be positioned under a flat surface of a fluid handling component.

3. The fluid delivery apparatus of claim 1, wherein a top side of the lower module is configured to be positioned adjacent to a bottom side of the upper module.

4. The fluid delivery apparatus of claim 1, further comprising a spacer having one or more subassembly apertures aligned with the one or more subassembly apertures in the upper module and sized to receive the one or more fasteners extending through the upper module and the spacer to releasably secure the upper module and the spacer to the base block.

5. The fluid delivery apparatus of claim 4, wherein the one or more fasteners comprise at least one threaded fastener, and wherein the base block further comprises a threaded bore to receive the threaded fastener.

6. The fluid delivery apparatus of claim 4, wherein the one or more fasteners when fastened to secure the upper module and the spacer to the base block, releasably secure the lower module between the upper module and the base block to form a fluid joint between the upper-module and the lower-module.

7. The fluid delivery apparatus of claim 6, wherein the spacer is dimensioned and configured such that overtightening of the fastener can not damage the fluid joint formed between the upper-module and the lower-module.

8. The fluid delivery apparatus of claim 1, wherein the base block is configured to be releasably secured to a flat surface.

9. The fluid delivery apparatus of claim 1, the apparatus further comprising a plurality of base blocks and a plurality of upper modules, each upper module received in a respective base block.

10. The fluid delivery apparatus of claim 9, wherein each base block includes a lateral side having a flat portion which permits each base block to be positioned adjacent another base block.

11. The fluid delivery apparatus of claim 1, the apparatus further comprising a spacer having an alignment aperture aligning the lower passageway of the lower module with the upper passageway of the upper module.

12. The fluid delivery apparatus of claim 1, wherein the cylindrical spacer includes a substantially cylindrical shape.

13. The fluid delivery apparatus of claim 1, wherein the fluid handling component is selected from the group consisting of a nozzle, inlet port, outlet port, pressure gauge, pressure regulator, pressure transducer, filter, purifier, mixing valve, pneumatic valve, manually operated valve, check valve, flow meter and mass flow controller.

14. A fluid delivery apparatus for transporting a fluid to one or more fluid handling components, said apparatus comprising:

an upper module including an upper passageway, the upper module configured to be coupled with a fluid handling component such that said upper passageway is in fluid communication with the fluid handling component;

a lower module including a lower passageway, the lower module configured to be coupled with the upper module such that the lower passageway is in fluid communication with the upper passageway;

a base block including a receptacle and a channel, the upper module received within the receptacle and the lower module extending through the channel; and wherein upper module includes a plurality of upper passageways, each upper passageway terminating in a lower module coupling port positioned at a bottom side of the upper module, said lower module further including a plurality of flow channels, each flow channel including a lower passageway terminating in a upper module coupling port positioned at a top side of the lower module, each upper module coupling port fluidly connected to a respective one of said lower module coupling ports.

15. The fluid delivery apparatus of claim 14, the apparatus further comprising a spacer having a plurality of alignment apertures aligning each upper modular coupling port of the lower module with a respective one of the lower modular coupling ports of the upper module.

16. The fluid delivery apparatus of claim 14, further comprising at least one flow channel terminating in a horizontally extending lateral port.

17. The fluid delivery apparatus of claim 16 further comprising a bracket for securing the at least one flow channel to the base block.

18. A fluid delivery apparatus for transporting a fluid to a fluid handling component, the apparatus comprising:

an upper module including a plurality of upper passageways, each upper passageway terminating in a lower module coupling port positioned at a bottom side of the upper module, and the upper module configured to be coupled with the fluid handling component such that at least one of the plurality of upper passageways is in fluid communication with the fluid handling component;

a lower module including a plurality of flow channels, each flow channel having a lower passageway terminating in a upper module coupling port positioned at a top side of the lower module, each upper module coupling port fluidly connected to a respective one of the lower module coupling, at least one of the plurality of flow channels terminating in a horizontally extending lateral port;

a base block including a receptacle and a channel, the upper module received within the receptacle and the lower module extending through the channel; and a bracket for securing the at least one of the plurality of flow channels to the base block.

\* \* \* \* \*